F. PYKOSZ.
TRAP.
APPLICATION FILED JULY 5, 1918.

1,278,209.

Patented Sept. 10, 1918.
2 SHEETS—SHEET 1.

Inventor
Felix Pykosz

By his Attorney

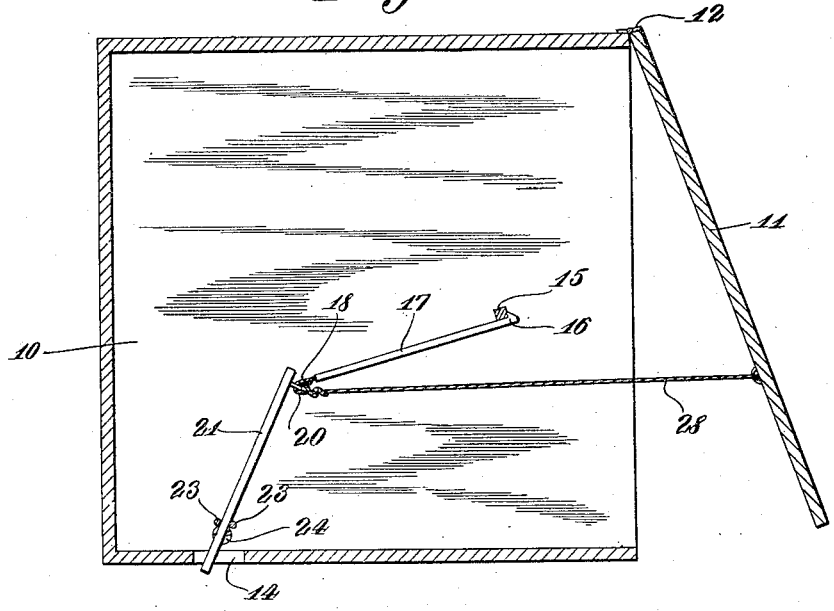
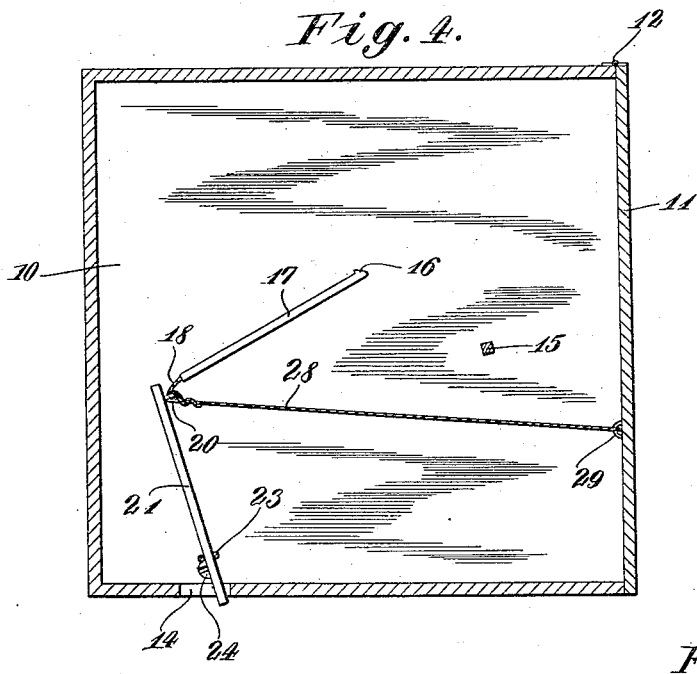

UNITED STATES PATENT OFFICE.

FELIX PYKOSZ, OF WATERBURY, CONNECTICUT.

TRAP.

1,278,209. Specification of Letters Patent. Patented Sept. 10, 1918.

Application filed July 5, 1918. Serial No. 243,360.

*To all whom it may concern:*

Be it known that I, FELIX PYKOSZ, a citizen of Poland, residing at Waterbury, county of New Haven, and State of Connecticut, have invented certain new and useful Improvements in Traps, of which the following is a specification.

This invention relates to improvements in traps, particularly to types adapted to catch small animals such as rats and mice.

The principal object of the invention is to provide a trap which can be easily constructed from material such as is likely to be convenient, and which will act in an effective manner in entrapping and retaining a captive animal.

A further object is to provide a trap which is sensitive in its operation and which is comprised of relatively few and simple parts; a string and bits of wood.

These and other like objects are attained by the novel construction and combination of parts hereinafter described and shown in the accompanying drawings, forming a material part of this disclosure, and in which:—

Fig. 3 is a plan view of the trap, the outer covering being removed, and,

Fig. 4 is a similar view of the same, parts being shown in another position.

Figure 1:
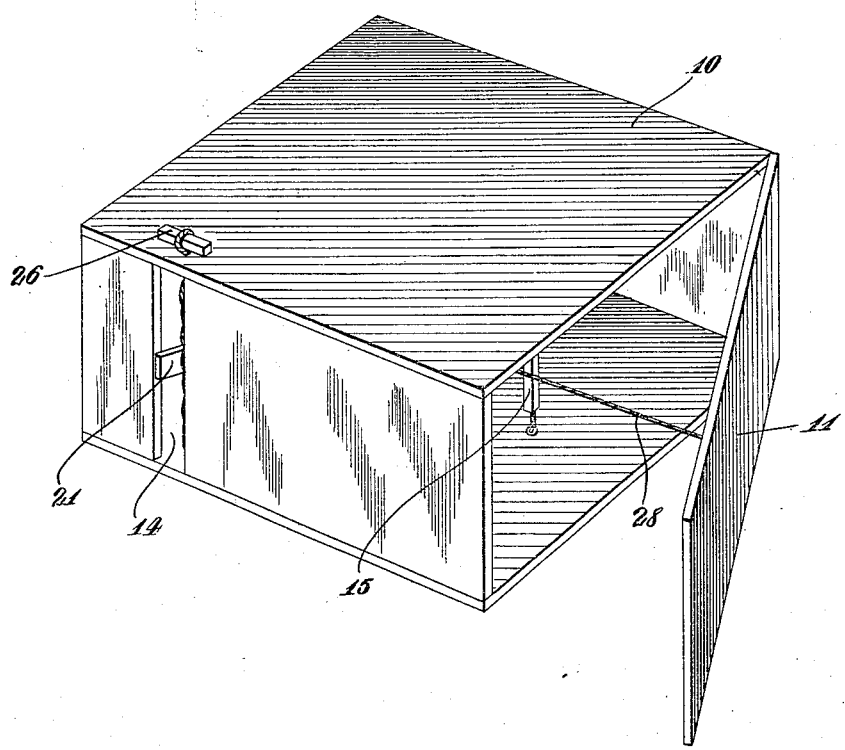
Figure 1 is a perspective view showing a trap made in accordance with the invention.
Figure 2:
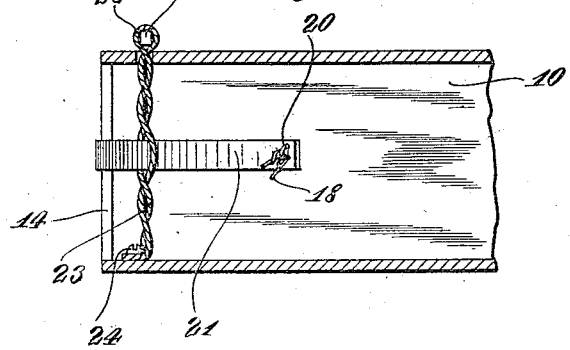
Fig. 2 is a fragmentary vertical sectional view of the same.

The trap comprises an ordinary rectangular casing 10, such for instance as a cigar box, having one of its ends removed and reconnected in the manner of a door or cover 11, to the main part of the structure by the hinges 12, so as to close the entire end of the box when in position.

An opening 14 is formed through the side of the box opposite to that upon which the hinges 12 are engaged, and passing vertically through the box, secured in the upper and lower sections thereof, is a rigid rectangular post 15, engageable with which is the hooked end 16 of a trigger bar 17, its opposite end being secured by a flexible connection 18 with an eye 20, fixed near the inner end of a torsion bar 21, extending through the opening 14 at its opposite end.

Engaged with the bar 21, at a point near its center, is a flexible cord 23, doubled and secured at its lower ends by a screw 24 to the bottom of the box, while the upper looped end 25 extends through an opening appropriately formed at the top of the box, and passing through the loop is a short keybar 26, by which the cord 23 may be twisted in such manner as to exert a torsional effect upon the bar 21, which passes between the strands of the doubled cord causing the torsion bar to normally spring away from the opening at the end of the box.

Also engaged in the eye 20 is another cord 28, attached to its opposite end in an eye 29, secured in the inner side of the door plate or cover 11.

In operation, the bar 21 being passed between the cord 23, and the cord 28 extended between the door 11 and eye 20, the trigger bar 17 is adjusted and engaged with the fixed post 15, whereupon the key-bar 26 is turned so as to cause a twist in the cord 23, drawing the hook 16 firmly against the post, the door 11 being at an open position as shown in Fig. 3.

Upon the entrance of an animal within the box it is likely to come in contact with the trigger bar 17 in such manner as to release the hook from engagement with the post, whereupon the twisted cord 23 exerts a torsional effect tending to move the bar 21, when freed, toward the rear of the box, closing the door in an obvious manner.

From the foregoing it will be seen that a cheap and effective trap has been disclosed capable of fulfilling the several objects mentioned.

Having thus described my invention what I claim as new and desire to secure by Letters Patent, is.

1. In a trap, the combination with a hollow structure having an open end and a door hingedly engaged with said structure adapted to cover the open end, of a vertical post rigidly fixed in said structure, a hooked trigger bar engageable therewith, a torsional bar having an eye at one end, means for actuating said torsional bar, and connections between said eye and said door, whereby upon the dislocation of said trigger bar, said door will be caused to close.

2. In a trap, the combination with a hollow rectangular structure, having an open end, and a door hingedly engaged with said structure adapted to cover the entrance thereto, of a vertical post extending between the upper and lower walls of said structure, a doubled cord secured on the bottom wall of said structure and extending upward through an opening formed in the upper wall thereof, a torsion bar secured between portions of said cord, means for twisting said cord whereby a torsional effect is obtained, connections between said torsion bar and said door, and a trigger bar engaged in said connection at one end and with said fixed post at the other.

3. In a trap of the class described, the combination with a hollow rectangular structure having an opening at one end and a door plate hingedly engaged adapted to cover the mentioned opening, of a twisted cord secured at its end within said structure and extending through an opening formed in the opposite wall thereof, a torsion bar secured between the elements of said twisted cord and adapted to be stressed thereby, an eye at the opposite end of said bar, flexible connections between said eye and said door, a hooked trigger bar also engaged in said eye, means for normally retaining said trigger bar in an operative position, and means for twisting said cord so as to exert tension upon said trigger bar.

In testimony whereof I have affixed my signature.

FELIX PYKOSZ.

Copies of this patent may be obtained for five cents each, by addressing the "Commissioner of Patents, Washington, D. C."